United States Patent
Lerda et al.

(10) Patent No.: US 8,958,775 B2
(45) Date of Patent: Feb. 17, 2015

(54) AGGREGATING VOICEMAIL MESSAGES FROM MULTIPLE SOURCES

(75) Inventors: Flavio Lerda, London (GB); Hugo Hudson, London (GB); Debashish Chatterjee, Bromley (GB); Bryan Mawhinney, Thames Ditton (GB); Marcus A. Foster, Kent (GB)

(73) Assignee: Google Inc., Mountain View, CA (US)

( * ) Notice: Subject to any disclaimer, the term of this patent is extended or adjusted under 35 U.S.C. 154(b) by 74 days.

(21) Appl. No.: 13/537,400

(22) Filed: Jun. 29, 2012

(65) Prior Publication Data

US 2013/0005305 A1 Jan. 3, 2013

Related U.S. Application Data

(60) Provisional application No. 61/504,118, filed on Jul. 1, 2011.

(51) Int. Cl.
*H04M 11/10* (2006.01)
*H04M 3/533* (2006.01)

(52) U.S. Cl.
CPC .. *H04M 3/53325* (2013.01); *H04M 2203/4509* (2013.01); *H04M 2203/253* (2013.01)
USPC ............ 455/413; 455/412.1; 455/412.2; 455/414.2; 455/417; 455/414.1

(58) Field of Classification Search
USPC .............................. 455/412.2, 413
See application file for complete search history.

(56) References Cited

U.S. PATENT DOCUMENTS

| | | | | |
|---|---|---|---|---|
| 8,396,456 | B2 * | 3/2013 | Brackbill et al. | 455/413 |
| 2008/0208980 | A1 | 8/2008 | Champan et al. | |
| 2009/0154663 | A1 | 6/2009 | Thaper et al. | |
| 2011/0098021 | A1 * | 4/2011 | Shaw et al. | 455/412.2 |
| 2011/0136474 | A1 * | 6/2011 | Ren et al. | 455/412.2 |

FOREIGN PATENT DOCUMENTS

| | | |
|---|---|---|
| EP | 1 599 022 | 11/2005 |
| WO | WO 98/48549 | 10/1998 |
| WO | WO 2004/084530 | 9/2004 |

OTHER PUBLICATIONS

Authorized Officer Jacques Reichert, International Search Report and Written Opinion for Application No. PCT/US2012/044917, dated Sep. 19, 2012, 13 pages.

(Continued)

*Primary Examiner* — Khalid Shaheed
(74) *Attorney, Agent, or Firm* — Fish & Richardson P.C.

(57) ABSTRACT

In one implementation, a computer-implemented method includes identifying, by a computer system, a plurality of voicemail messages that are associated with a particular user and that are from a plurality of voicemail sources; and generating, by the computer system, a plurality of graphical display elements that represent the identified plurality of voicemail messages and that include source identifiers that indicate a voicemail source from the plurality of voicemail sources for each of the plurality of voicemail messages. The method can further include providing the plurality of graphical display elements with the source identifiers for the plurality of voicemail messages in a user interface through which the plurality of voicemail messages from the plurality of voicemail sources are caused to be played based on received user input.

18 Claims, 5 Drawing Sheets

(56) References Cited

OTHER PUBLICATIONS

Palin Ningthoujam "6 Online Email Aggregators that Do More Than Just Aggregate" Aug. 18, 2008.
"MessageBank—Telstra Enterprise & Government" [online]. [retrieved on Apr. 15, 2011]. Retrieved from the Internet: http://www.telstraenterprise.com/productsservices/mobility/businesscommunications/Page.
"How Fusion Voicemail Plus Works" [online] [retrieved on Apr. 18, 2011]. Retrieved from the Internet: http://www.fusionvoicemailplus.com/marketing/how.html.
"Question About Fusion Voicemail Plus Visual Voicemail" [online] [retrieved on Apr. 18, 2011] Retrieved from the Internet: http://www.fusionvoicemailplus.com/marketing/faq.html.
"MessageBank—Standard Mobile Services—Telstra" [online] [retrieved on Apr. 15, 2011] Retrieved from the Internet: http://telstra.com.au/mobile/services/messagebank/html.
Telstra "Mobile Message Bank Standard User Guide".

* cited by examiner

AGGREGATING VOICEMAIL MESSAGES FROM MULTIPLE SOURCES

CROSS-REFERENCE TO RELATED APPLICATIONS

This application claims the benefit of priority Under 35 U.S.C. §119(e) of U.S. Provisional Application Ser. No. 61/504,118, filed on Jul. 1, 2011. The entire contents of which is incorporated herein by reference.

TECHNICAL FIELD

This document generally describes aggregating voicemail messages from multiple sources.

BACKGROUND

A variety of telecommunication providers (e.g., landline telecommunication providers, cellular telephone telecommunication providers, voice over IP (VOIP) telecommunication providers) provide voicemail services to clients. A voicemail service can allow users to leave voicemail messages (e.g., audio messages, video messages) for other users, who can access their voicemail accounts to receive and play back the messages from any of a variety of telephone and/or computing devices (e.g., landline telephone, cellular telephone, smartphone, or laptop computer). To access (e.g., play) voicemail messages, users can call a designated number with a mobile or land-based communication device to interact with a voicemail service through a series of voice or keypad prompts. Some voicemail services provide computer-based graphical user interfaces for accessing voicemail messages.

SUMMARY

This document describes techniques, methods, systems, and computer program products for providing voicemail to users. A user may have multiple voicemail accounts from multiple voicemail providers (e.g., communication network carriers, Internet-based services, and private branch exchanges (PBXs)). Voicemail can be aggregated across multiple voicemail accounts and/or multiple different voicemail providers and can be provided in a single voicemail interface to voicemail users.

For example, a particular user may have a mobile phone for personal use, another mobile phone she uses for work, a desk phone at work, a home phone, and an Internet-based phone (e.g., voice over IP (VOIP) phone). Each of these telephones can be associated with a different telephone number and can have separate voicemail accounts, which may be hosted by different voicemail systems. Voicemail messages left for the user at any of her telephone numbers can be aggregated, and representations of the messages can be presented within the single voicemail interface. For example, the user's personal mobile phone and the mobile phone she uses for work may be associated with the same or with different communication network carriers. By running one or more computer applications (e.g., software applications, firmware applications, application-specific integrated circuits (ASIC), or any combination thereof) executed by either mobile phone (e.g., smartphones), she can interact with an interface that displays comingled graphical representations (e.g., icons, text, etc.) of voicemail messages left at her personal mobile number, voicemail messages left at her work mobile number, and/or voicemail messages left at any of her other numbers. The representations can include identifiers for distinguishing the source of each message. Through the voicemail identifiers, for example, the user can distinguish whether a particular voicemail message was left at her personal mobile number, her work mobile number, or at another of her numbers.

Computer applications executed by mobile phones and/or other suitable computing devices can interface with various voicemail provider backend systems using source-specific adapters. For example, a voicemail message left for a user at her personal mobile number can be retrieved from a voicemail provider that hosts her personal mobile voicemail account using an adapter configured to interface with the provider. Voicemail commands from users can be forwarded by such computer applications that are executed by mobile phone (and/or by a server-based application in communication with the mobile phone) to various voicemail providers. For example, upon listening to the voicemail message left at her personal mobile number, the user may indicate that the message is to be deleted. Using an adapter configured to interface with a voicemail provider hosting her personal mobile voicemail account, a command to delete the message can be forwarded to the provider, and the provider can delete the message.

Voicemail messages may be aggregated locally on, and/or remotely from, mobile phones and/or other suitable computing devices. For instance, through the use of various adapters, a mobile phone may obtain voicemail messages from a variety of different voicemail providers and may store them locally (e.g., in the form of digitized files that are associated with meta data that defines characteristics of particular messages such as the account to which the message was left, the type of system that manages the account, the time and date the message was left, and other such information) on the mobile phone. Additionally, the voicemail providers from which the voicemail messages are obtained may retain local copies of the voicemail messages as well. When the mobile phone receives a command to modify (e.g., delete) a voicemail message, the modification can be made to the copy of the voicemail message that is local to the mobile phone and a corresponding command can be sent to a corresponding voicemail provider using an adapter for the particular voicemail provider. Voicemail messages can also be maintained remotely by voicemail providers and can be accessed by a mobile phone as needed.

In one implementation, a computer-implemented method includes identifying, by a computer system, a plurality of voicemail messages that are associated with a particular user and that are from a plurality of voicemail sources; and generating, by the computer system, a plurality of graphical display elements that represent the identified plurality of voicemail messages and that include source identifiers that indicate a voicemail source from the plurality of voicemail sources for each of the plurality of voicemail messages. The method can further include providing the plurality of graphical display elements with the source identifiers for the plurality of voicemail messages in a user interface through which the plurality of voicemail messages from the plurality of voicemail sources are caused to be played based on received user input.

In another implementation, a computer program product tangibly embodied on a non-transitory computer readable medium storing instructions that, when executed, cause a computer system to perform operations including identifying, by the computer system, a plurality of voicemail messages that are associated with a particular user and that are from a plurality of voicemail sources; generating, by the computer system, a plurality of graphical display elements that represent the identified plurality of voicemail messages and that include source identifiers that indicate a voicemail source from the plurality of voicemail sources for each of the plurality of voicemail messages; and providing the plurality of graphical display elements with the source identifiers for the plurality of voicemail messages in a user interface through which the plurality of voicemail messages from the plurality of voicemail sources are caused to be played based on received user input.

In another implementation, a system can include a computer system and an application of the computer system to identify a plurality of voicemail messages that are associated with a particular user and that are from a plurality of voicemail sources, and to generate a plurality of graphical display elements that represent the identified plurality of voicemail messages and that include source identifiers that indicate a voicemail source from the plurality of voicemail sources for each of the plurality of voicemail messages. The system can further include an interface to the application to provide the plurality of graphical display elements with the source identifiers for the plurality of voicemail messages through which the plurality of voicemail messages from the plurality of voicemail sources are caused to be played based on received user input.

The details of one or more embodiments are set forth in the accompanying drawings and the description below. Various advantages can be provided by the disclosed techniques, methods, systems, and computer program products. For example, users with multiple voicemail accounts can more easily monitor and manage their accounts. Rather than monitor and manage each account separately, users can interact with a single voicemail interface to access voicemail messages from all of their accounts. By providing voicemail source identifiers for each message, message context can be maintained. For example, users can readily determine whether a particular message was left at a personal number, a work number, or another sort of number. By providing comingled messages from multiple voicemail accounts, relations between messages can be expressed. For example, users can readily determine whether a particular caller left messages at multiple different numbers, the times at which the messages were left, and the sequence in which they were left.

In another example, source-specific adapters can be used to communicate with voicemail providers and with messages stored in a common voicemail repository. By providing source-specific adapters within a security framework, voicemail providers can be assured that access to their voicemail data by other voicemail providers is prevented. By providing access to messages included in the common voicemail repository to applications for presenting a user interface, a unified user experience can be created. Thus, users can be relieved from the nuisance of having to learn and navigate multiple voicemail systems.

Other features, objects, and advantages of the invention will be apparent from the description and drawings, and from the claims.

DESCRIPTION OF DRAWINGS

Like reference symbols in the various drawings indicate like elements.

DETAILED DESCRIPTION

This document generally describes techniques, methods, systems, and computer program products for aggregating voicemail messages from multiple sources. In general, users may have multiple voicemail accounts from multiple voicemail providers (e.g., communication network carriers, Internet-based services, private branch exchanges (PBXs), etc.). By aggregating voicemail from multiple accounts and multiple providers in a single voicemail interface, a unified experience can be provided to users. For example, a single voicemail interface can display comingled graphical representations (e.g., icons, text, etc.) of voicemail messages that include source identifiers for each of the messages. Thus, users can readily identify the source of each voicemail message, and can interact with each message in a consistent manner.

Figure 1A:
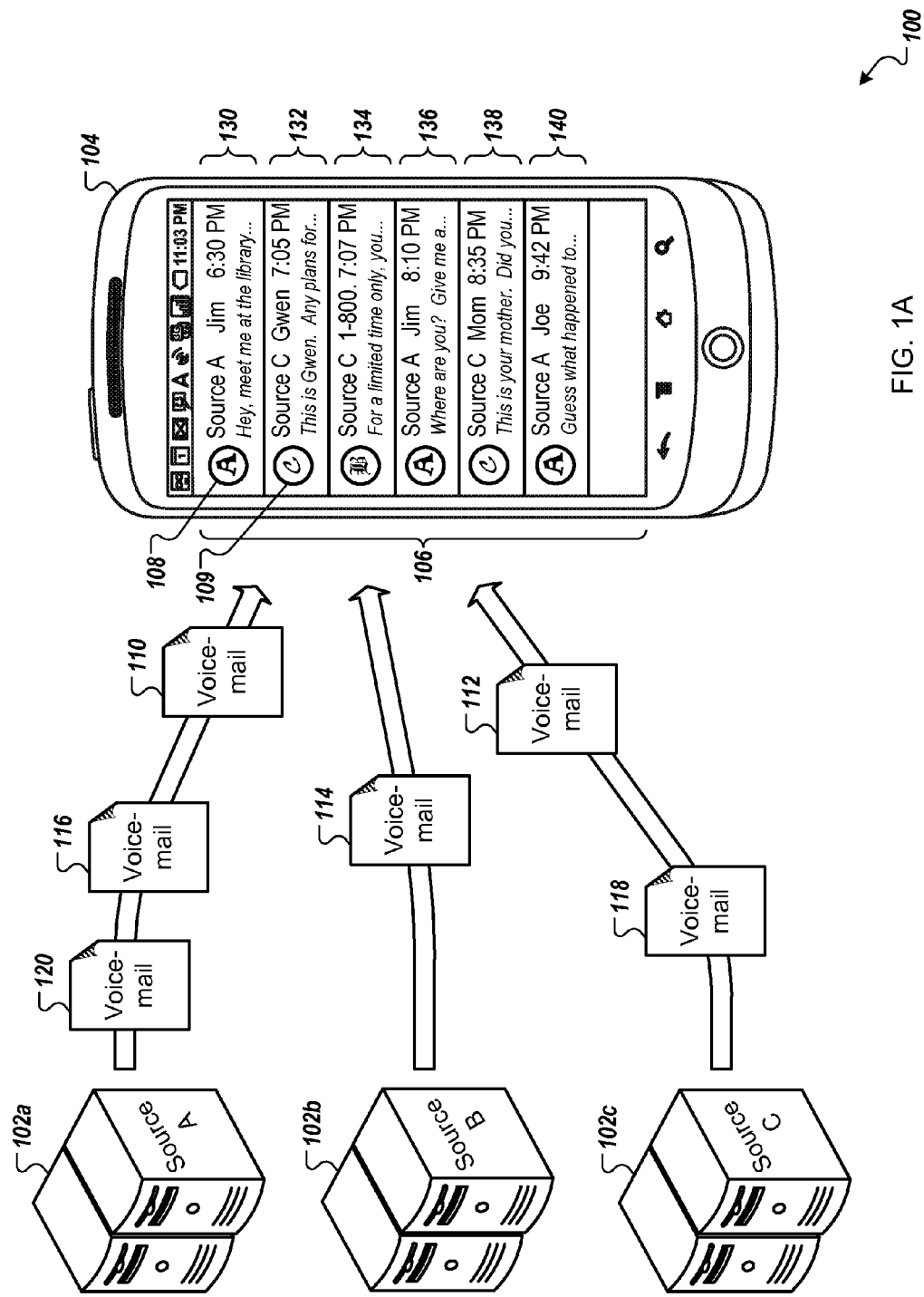
FIGS. 1A and 1B depict conceptual diagrams of example systems for aggregating voicemail messages from multiple sources.

FIG. 1A depicts a conceptual diagram of an example system 100 for aggregating voicemail messages from multiple sources. The example system 100 includes computer systems 102a-c that can provide voicemail services to users, and a computing device 104, which can be employed by a user to access and manage voicemail messages from the voicemail service providers (computer system 102a-c). The computer systems 102a-c are associated with example voicemail service providers Source A (102a), Source B (102b), and Source C (102c), respectively. The computer systems 102a-c can be any of a variety of appropriate computing devices, such as one or more computer servers. The computing device 104 can be any of a variety of appropriate computing devices as well, such as laptop computers, desktop computers, mobile computing devices (e.g., smartphones, cell phones, personal digital assistants (PDAs)), and/or tablet computing devices. The computer systems 102a-c and the computing device 104 can communicate with each other over one or more networks, such as the Internet, local area network (LAN), wide area network (WAN), virtual private network (VPN), wireless network, cellular network, 3G/4G network, fiber optic network, or any appropriate combination thereof.

In the depicted example system 100, the computer systems 102a-c can provide to the computing device 104 information that is associated with voicemail messages. For example, the computing device 104 may be a personal smartphone of a particular user (e.g., "Bob"). In the present example, Bob's friend Jim calls Bob's personal mobile number. As it turns out, Bob is at a movie at the time of the call, so he does not answer. The call is directed by the computer system 102a associated with Source A (e.g., a communication network carrier) to Bob's personal mobile voicemail account, and Jim leaves a message. Source A can employ computer system 102a to provide information associated with the voicemail message 110 to the computing device 104, or to one or more intermediary computer systems or devices in communication with the computing device 104. For instance, when the computing device 104 and the computer system 102a are next communicatively connected (e.g., connected over one or more networks), the computer system 102a can provide a notification to the computing device 104 that the voicemail message 110 from Jim has been received. In response, the computing device 104 may provide an alert that the new message 110 has been received (e.g., visual alert on the screen, audible alert, vibrate to indicate a message has been received).

One or more applications (e.g., software application, firmware application, ASICs, or any combination thereof) can be executed by the computing device 104 to provide a user interface 106 that presents graphic display elements that represent voicemail messages from each of the voicemail sources 102a-c. In the present example, based on information associated with the voicemail message 110, the application can generate a graphic display element 130 that represents the voicemail message 110. The graphic display element 130 can include a source identifier 108 that indicates a voicemail source (e.g., Source A) of the voicemail message 110. For example, the source identifier 108 can include graphical (e.g., an icon) and/or textual (e.g., a descriptive label) elements that enable the user to identify the message source. The graphical display element 130 can also include graphical and/or textual elements that enable the user to identify other message attributes, such as caller identity (e.g., Jim), time of receipt of the message (e.g., 6:30 PM), and/or message content (e.g., a message transcription, such as "Hey, meet me at the library . . . "). In some implementations, representations of message attributes may be configurable by the user. For example, Bob can indicate that selected graphics or photos represent particular voicemail sources and/or callers. In some implementations, the graphics or photos may be selected by the sources and/or callers. Referring to source identifier 108, for example, Source A may indicate that a capital letter "A" icon can serve as a graphical representation of messages that it provides.

As voicemail messages for the user are provided by callers, the messages can be identified and graphical representations of the messages can be provided to the user. For example, Bob's friend Gwen may call Bob's home phone number (e.g., a landline number). Since Bob is not home, he does not answer, and the call is directed by the computer system 102c associated with Source C (e.g., a landline phone service) to Bob's home phone voicemail account, and Gwen leaves a message. Source C can employ computer system 102c to provide information associated with the voicemail message 112 (e.g., Gwen's message) to the computing device 104, where a graphical representation of the message can be generated and provided to Bob via the user interface 106 as graphical display element 132. Through the graphical display element 132, Bob can receive potentially important information about Gwen's message without directly accessing (e.g., dialing into) his home phone voicemail account. For example, upon viewing a source identifier 109 included in the graphical display element 132 associated with Gwen's message, Bob can determine that Gwen called his home phone number. Perhaps Gwen believes that Bob is at home, or perhaps she believes that Bob is not at home, and she prefers leaving a message to the possibility of speaking with him directly. In any case, the context of which of Bob's numbers was used by Gwen when leaving a message may be relevant to Bob.

In the present example, additional callers can leave voicemail messages for Bob. For example, an unknown caller calls Bob's work phone number. The call is directed by the computer system 102b associated with Source B (e.g., a voice over IP (VoIP) service) to Bob's work voicemail account. Source B can employ computer system 102b to provide information associated with the voicemail message 114 to the computing device 104, where a graphical representation of the message can be generated and provided to Bob via the user interface 106 as graphical display element 134. Similarly, Bob can receive multiple additional voicemails 116, 118, and 120, and information associated with the voicemails can be provided by computer systems associated with the voicemail sources to the computing device 104, where the messages can be represented as graphic display elements 136, 138, and 140, respectively.

At the user interface 106, graphical display elements can be arranged in a comingled manner so that representations of voicemail messages from multiple sources are interspersed. For example, the graphical display elements 130, 132, 134, 136, 138, and 140 can be provided in an arrangement based on time of receipt of the respective voicemail messages 110, 112, 114, 116, 118, and 120. Thus, in the present example, after exiting the movie, Bob can readily identify the sequence of calls he missed while at the movie, and he can identify the number (i.e., voicemail source) each caller used while attempting to contact him. Rather than checking each of his voicemail accounts separately, Bob can view representations of his voicemail messages in a single unified interface.

In some implementations, voicemail messages may be arranged by a voicemail attribute other than time of receipt. For example, Bob may indicate that his voicemail messages are to be ordered by caller identity. In the present example, voicemail messages 110 and 116 are both from his friend Jim. Graphical display elements 130 and 136 representing voicemail messages 110 and 116 (respectively) can be grouped together, for example, and Bob can elect to interact with the messages as desired (e.g., play the messages in sequence, play the first message, play the last message, etc.). As another example, Bob can indicate that his voicemail messages are to be ordered by voicemail message source. In the present example, voicemail messages 110, 116, and 120 are associated with his personal mobile account. Graphical display elements 130, 136, and 140 representing voicemail messages 110, 116, and 120 (respectively) can be grouped together, for example, and Bob can elect to interact with the messages as desired. A variety of other attributes can be used to organize voicemail messages from multiple different voicemail sources, such as message content (e.g., messages can be grouped by topic, messages can be grouped by urgency—a message stating that "you need to get back to me as soon as possible" can be grouped with other urgent messages at the top of the interface 106), caller location (e.g., area code for a caller's telephone number, current geographic locations associated with callers—voicemails for callers that are located closer to a current geographic location of the computing device 104 can be listed before voicemails for callers who are located further away).

The user interface 106 enables the user to interact with voicemail messages in a consistent manner, regardless of voicemail source. For example, actions that Bob performs through the user interface 106 (e.g., pressing a particular number on a keypad to delete a voicemail message, swiping across a graphical element to save a message) to cause various voicemail operations (e.g., playing, deleting, forwarding, saving) to be performed can be the for each of the example voicemail sources 102a-c. For instance, Bob can perform the same actions with regard to voicemail messages left by callers of his personal mobile number (e.g., messages from Source A) and with regard to voicemail messages from left by callers of his work number (e.g., messages from Source B). Thus, in the present example, Bob is relieved from having to separately access each voicemail account to access his messages, and from having to learn the idiosyncrasies of each voicemail system.

Figure 1B:
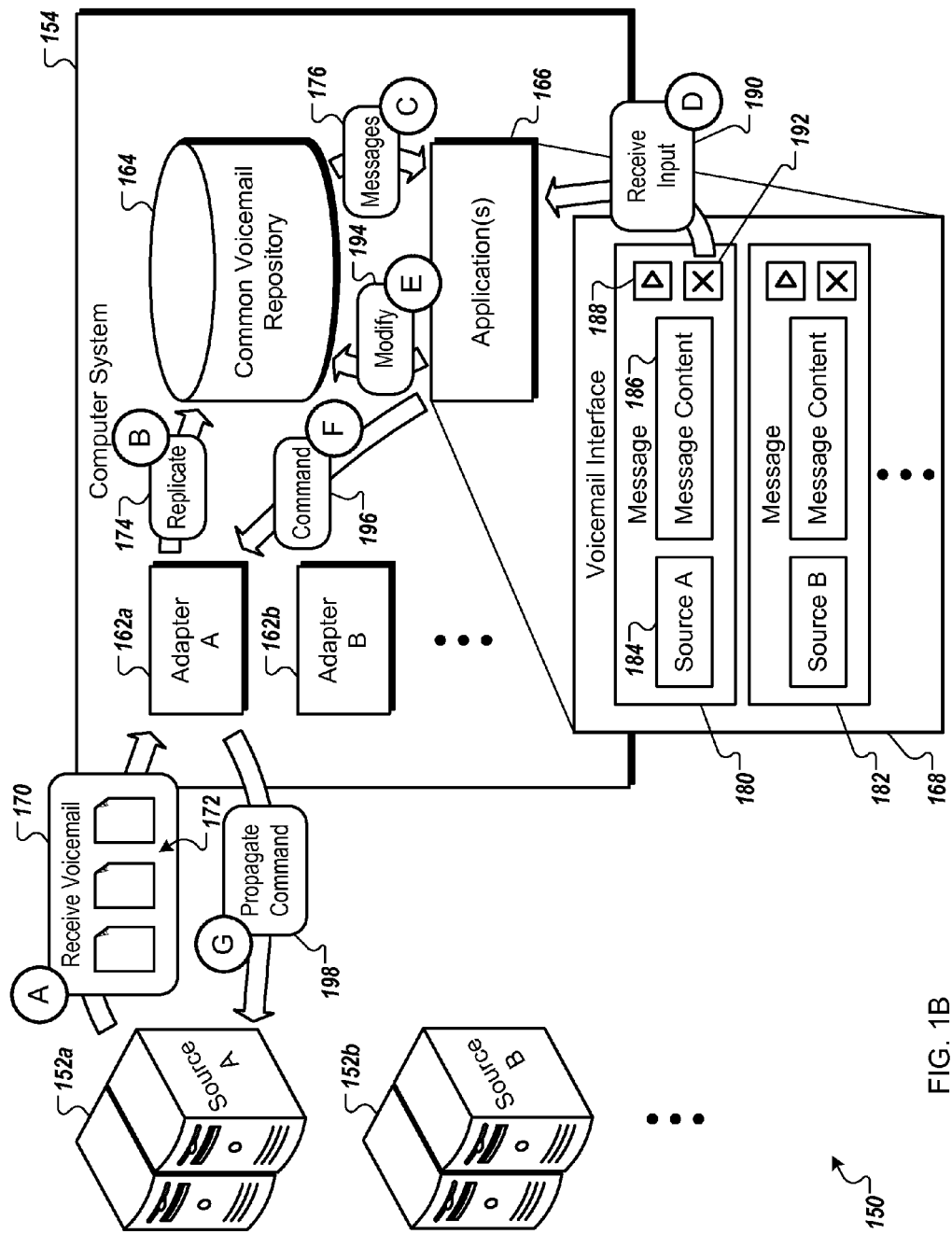

FIG. 1B depicts a conceptual diagram of an example system 150 for aggregating voicemail messages from multiple sources. The system 150 includes computer systems 152a, 152*b*, which can be similar to the computer systems 102*a-c* described above with regard to FIG. 1A. The system 150 also includes a computer system 154, components of which may reside on a single computing device (e.g., the computing device 104, described with regard to FIG. 1A) or may be distributed across multiple computing devices (e.g., distributed across the computing device 104 and one or more other computing devices and/or servers). Any of a variety of appropriate computing devices can be used. The computer systems 152*a*, 152*b*, and the computer system 154 can communicate over one or more communication networks, such the Internet, wireless networks and/or cellular networks.

The computer system 154 includes a plurality of source-specific adapters 162*a-b*. For example, a source-specific adapter 162*a* (e.g., Adapter A) can be configured to use one or more communications protocols that are specific to Source A (152*a*), and a source-specific adapter 162*b* (e.g., Adapter B) can be configured to use one or more communication protocols that are specific to Source B (152*b*). In the present example, the source-specific adapters 162*a* and 162*b* can communicate with computer systems 152*a* and 152*b*, respectively, and can obtain information regarding Source A and Source B, respectively. Information regarding voicemail sources can include voicemail message data, and such data can be stored in a voicemail repository (e.g., a database, a file system, or another appropriate type of storage system). For example, voicemail message data can be retrieved from each of Sources A and B, and the retrieved message data can be stored in a common voicemail repository 164. The common voicemail repository 164 can store voicemail data such as time of receipt of a message, duration of the message, source of the message, identity (e.g., number) of the caller, message content, and/or other relevant voicemail attributes.

The computer system 154 can execute one or more applications 166 that can generate a voicemail interface 168. For example, the application 166 can include computer code that, when executed, perform operations related to identifying voicemail messages, and generating and providing representations of the voicemail messages. In some implementations, source-specific adapters, a voicemail repository, and one or more voicemail applications may exist on a single computing device. For example, the source-specific adapters 162*a* and 162*b*, the common voicemail repository 164, and the application 166 can exist on a computing device such as computing device 104 (shown in FIG. 1A). As another example, the source-specific adapters 162*a* and 162*b*, the common voicemail repository 164, and the application 166 can operate within a cloud-based system (not shown), and the voicemail interface 168 can be presented via a client application such as a web browser. In some implementations, one or more source-specific adapters, the voicemail repository, and/or the application may exist on multiple computing devices and/or servers. For example, the source-specific adapters 162*a* and 162*b*, and the common voicemail repository 164 can exist on a server system (not shown), and the application 166 can be executed by a computing device (e.g., computing device 104) in communication with the server system.

In addition to depicting a conceptual diagram of the example system 150 for aggregating voicemail messages from multiple sources, FIG. 1B also illustrates an example flow of data within the system 150 during steps A to G. The steps A to G may occur in the illustrated sequence, or they may occur in a sequence that is different than in the illustrated sequence. For example, the steps A to G may be performed by the computer system 154 in a variety of orders, and/or one or more steps may be performed concurrently.

As indicated by step A (170), voicemails can be received by the computer system 154 from the computer system 152*a*. For example, the computer system 154 can use the source-specific adapter 162*a* (Adapter A) to retrieve voicemail message information 172 (e.g., audio data for voicemail messages, metadata associated with voicemail messages indicating one or more attributes associated with a message, such as caller id and/or message timestamp) from the computer system 152*a* (Source A). In some implementations, adapters may obtain information through polling. For example, the source-specific adapter 162*a* (Adapter A) can be configured to poll the computer system 152*a* (Source A) at predetermined intervals. In some implementations, information may be pushed to adapters. For example, the computer system 152*a* (Source A) can use a push mechanism (e.g., via the Internet) to provide voicemail message information 172 to the source-specific adapter 162*a* (Adapter A) as new messages arrive or existing messages are modified. In some implementations, adapters may obtain information through a mix of polling and pushing. For example, the computer system 152*a* (Source A) can use a push mechanism (e.g., a Short Message Service (SMS) message) to alert the source-specific adapter 162*a* (Adapter A) to the arrival of a new message (or the modification of an existing message), and the adapter 162*a* can use the alert as a signal to poll an appropriate backend system (e.g., the computer system 152*a*) for additional data.

As indicated by step B (174), the voicemails obtained from the computer system 152*a* using the adapter 162*a* can be replicated and stored in the common voicemail repository 164. For example, upon receiving voicemail message information 172, the source-specific adapter 162*a* (Adapter A) can replicate voicemail messages at the common voicemail repository 164. Thus, in the present example, original voicemail messages may continue to exist at a voicemail source (e.g., Source A), while copies of the messages are stored in a repository (e.g., common voicemail repository 164) that maintains copies of messages from multiple voicemail sources (e.g., Source A, Source B, etc.). As voicemail messages can be maintained at their original sources and at a repository, for example, users have the option of accessing voicemail from a particular source via an interface provided by the source, or via the voicemail interface 168. Various techniques may be used to synchronize the common voicemail repository 164 with voicemail sources, as is discussed in further detail in the steps below.

As indicated by step C (176), voicemail messages can be identified by the application(s) 166 and used to provide a user interface 168 through which users can access voicemail messages from the voicemail sources 152*a-b*. For example, the application(s) 166 can identify voicemail messages from multiple sources (e.g., Source A, Source B, etc.) stored in the common voicemail repository 164. Upon identifying the voicemail messages, for example, the application 166 can generate a plurality of graphical display elements 180, 182, each element representing a particular message, and can provide the graphic display elements 180, 182 in the user interface 168. The graphic display element 180, for example, can include a source identifier 184 (e.g., a graphic, icon, and/or text associated with Source A), message content 186 (e.g., audio, video, and/or textual content associated with a particular voicemail message), and/or other message metadata, such as caller identity, time of message receipt, and message duration.

The user interface 168 can also include various interface controls for interacting with voicemail messages. In the present example, the user interface 168 includes a control 188 for playing and a control 192 for deleting the voicemail message represented by the graphical display element 180. If the user interacts with the control 188, for example, the voicemail interface 168 can cause the voicemail message to be played, and audio and/or video content associated with the voicemail message can be presented to the user via the voicemail interface 168. As indicated by step D (190), if the user interacts with the control 192, corresponding input can be received by the application 166. In the present example, the application 166 can perform operations to facilitate deletion of the message from the common voicemail repository 164 and the originating voicemail source (e.g., Source A), thus ensuring synchronization between the data sources.

As indicated by step E (194), the application(s) 166 can modify information stored in the common voicemail repository 164 based, at least in part, on user input received through the user interface (step D). In the present example, the application 166 can identify and remove data associated with the voicemail message represented by the graphic display element 180. As indicated by step F (196), the application 166 can also send a command to the source-specific adapter 162a (Adapter A) to delete the voicemail message from the originating voicemail source (Source A). For example, the command can include an identifier associated with the voicemail message represented by the graphic display element 180, and a modification command type (e.g., delete, forward, etc.). Steps E (194) and F (196) may occur concurrently or in reverse order, for example, and/or may include additional sub-steps to verify successful completion. For example, the application(s) 166 may verify that a command forwarded to a source-specific adapter is received and successfully processed by an originating voicemail source before performing a corresponding modification to the common voicemail repository 164.

As indicated by step G (198), the command to modify a voicemail message can be configured for an originating source and propagated to such an originating source. For example, the command to delete the voicemail message represented by the graphic display element 180 can be configured by the source-specific adapter 162a (Adapter A) as a delete command according to one or more protocols used by the computer system 152a and can be propagated by the source-specific adapter 162a to the computer system 152a (Source A). The computer system 152a can receive the command and process the command, for example, by removing data associated with the voicemail message. In some implementations, confirmation of message modification (e.g., deletion, forwarding, etc.) may be provided to the computer system 154. For example, upon successfully deleting the voicemail message, the computer system 152a can provide confirmation to the source-specific adapter 162a.

In some implementations, when a message is modified, an indication of the modification may be provided to the user. For example, upon successfully deleting the voicemail message represented by the graphical display element 180, the voicemail interface 168 can visually remove the graphical display element 180. Such visual indications may be provided regardless of whether the modification was initiated using the voicemail interface 168 or an interface provided by a message source. For example, if the user had accessed his voicemail account using an interface provided by the computer system 152a (Source A) to delete the message represented by the graphical display element 180, the original message can be deleted, the computer system 154 can receive an indication of the deletion via the source-specific adapter 162a (Adapter A), and the adapter can remove data associated with the message from the common voicemail repository 164. Recognizing the change, the application(s) 166 can update the voicemail interface 168 to reflect the change, for example, by removing the graphical display element 180.

Figure 2:
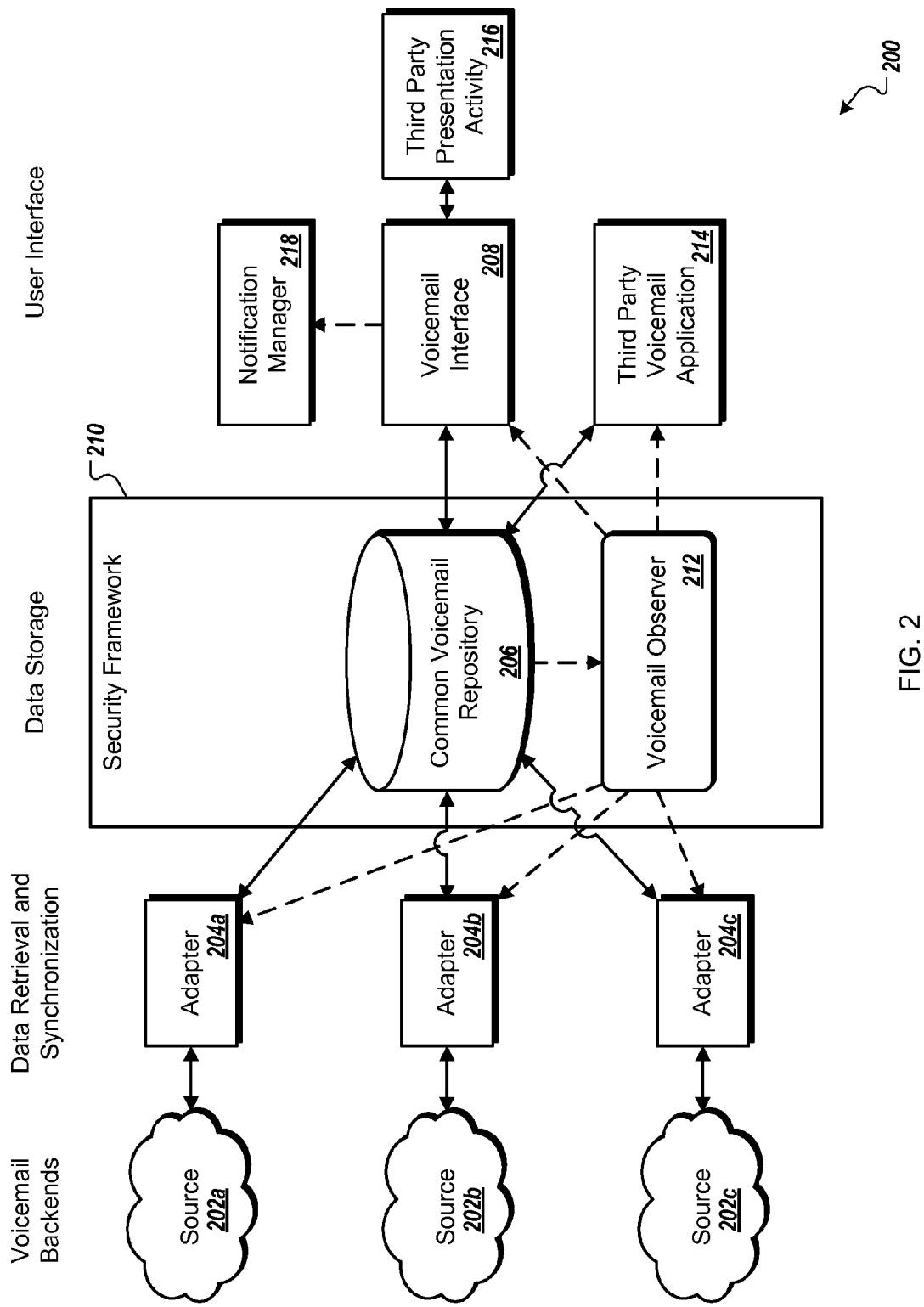
FIG. 2 is a block diagram of an example system for aggregating voicemail messages from multiple sources.

FIG. 2 is a block diagram of an example system 200 for aggregating voicemail messages from multiple sources. The example system 200 includes multiple voicemail sources 202a-c (e.g., voicemail backends such as communication network carriers, or other voicemail providers or services). Each of the voicemail sources 202a-c can include any of a variety appropriate computer systems, such as the computer systems 102a-c and/or 152a-b described above with regard to FIGS. 1A and 1B, respectively. The system 200 can also include multiple source-specific adapters 204a-c, a common voicemail repository 206, and a voicemail interface 208, which can be similar to the source-specific adapters 162a-b, the common voicemail repository 164, and the voicemail interface 168, respectively, as described above with regard to FIG. 1B. For example, the voicemail sources 202a-c and the source-specific adapters 204a-c can use Open Mobile Terminal Platform (OMTP) technologies and/or other appropriate standards or protocols. The voicemail sources 202a-c and the source-specific adapters 204a-c can communicate over one or more communication networks, such as the Internet and/or wireless networks. The source-specific adapters 204a-c, the common voicemail repository 206, and/or the voicemail interface 208 can operate on a single computing device (e.g., the computing device 104, shown in FIG. 1A), or may be distributed across multiple computing devices and/or servers. For instance, the source-specific adapters 204a-c, the common voicemail repository 206, and/or the voicemail interface 208 can be distributed across a client computing device and cloud computing server system.

As shown in FIG. 2, for example, each of the source-specific adapters 204a-c can perform data retrieval and synchronization between the respective voicemail sources 202a-c and the common voicemail repository 206 using a security framework 210. The security framework 210 can be configured to identify multiple adapters such as the source-specific adapters 204a-c, for example, and to handle permissions for communications between the common voicemail repository 206, the adapters 204a-c, and other applications (e.g., interfaces) that may request access to data stored in the repository. For example, the source-specific adapter 204a can communicate with the voicemail source 202a and can send and receive data associated with one or more voicemail messages for a particular user. Upon receiving data from the voicemail source 202a, for example, the source-specific adapter 204a can use the security framework 210 to store or modify at least a portion of the data at the common voicemail repository 206.

In some implementations, a voicemail source can be restricted from accessing voicemail data (e.g., messages) from other voicemail sources that are stored in the repository. For example, the security framework 210 can restrict the voicemail adapters 204b, 204c from accessing voicemail data from the voicemail source 202a stored in the common voicemail repository 206. Thus, in the present example, the voicemail source 202a can be provided with a mechanism (e.g., the voicemail adapter 202a) for accessing and synchronizing its own voicemail data stored in the common voicemail repository 206 while other voicemail sources (e.g., voicemail sources 202b, 202c) are prevented from accessing the voicemail data associated with the voicemail source 202a. However, although the voicemail sources 202a-c can be restricted to accessing only their own associated voicemail data in the common voicemail repository 206, the security framework 201 can permit a user to access to voicemail messages and associated information from each of the sources 202a-c.

The example system 200 can include a voicemail observer 212. For example, the voicemail observer 212 can operate within the security framework 210 and can detect and relay changes to data stored by the common voicemail repository 206 to the appropriate voicemail backends. For example, if a user employs an interface provided by a computing device application (e.g., the voicemail interface 208) to delete a voicemail message associated with the voicemail source 202a and stored by the common voicemail repository 206, the voicemail observer 212 can detect the deletion, and can send notification of the deletion to the source-specific adapter 204a. The notification can include identification information associated with the deleted message, for example. Upon receiving the notification, for example, the source-specific adapter 204a can communicate with the voicemail source 202a regarding the message deletion from the common voicemail repository 206, and the voicemail source 202a can perform a corresponding voicemail message deletion, thus synchronizing with the common voicemail repository 206. As the source-specific adapter 204a is notified by the voicemail observer 212 of changes that pertain to the voicemail source 202a, but not of changes that pertain to other voicemail sources (e.g., voicemail sources 202b-c), the source-specific adapters 202a-c in the present example need not communicate with or be aware of each other. Thus, the voicemail observer 212 operating within the security framework 210 can facilitate security within the example system 200.

The voicemail observer 212 in the present example can also detect and relay changes to data stored by the common voicemail repository 206 to the voicemail interface 208 and to a third party voicemail application 214. For example, if a user were to employ an interface provided by the voicemail source 202a (e.g., a voice menu system provided by a communication network carrier) to play and delete a voicemail message, the source-specific adapter 204a can receive information associated with the deletion and can delete a corresponding voicemail message from the common voicemail repository 206, thus synchronizing the repository 206 with the voicemail source 202a. The voicemail observer 212 can recognize the change to the common voicemail repository 206, for example, and can send a notification to the change to the voicemail interface 208 and/or the third party voicemail application 214. In the present example, upon receiving notification of the change, the voicemail interface 208 and/or the third party voicemail application 214 can perform a corresponding update, such as removing a visual representation of the deleted voicemail message.

The voicemail interface 208 and/or the third party voicemail application 214 can enable the user to interact with (e.g., play, delete, forward, save, annotate, etc.) voicemail messages. For example, the voicemail interface 208 can be a native voicemail application executed by a computing device (e.g., the computing device 104, shown in FIG. 1A). A notification manager 218 can receive notification of incoming voicemail messages from the voicemail interface 208, for example, and can notify users through various visual, auditory, and tactile mechanisms. The third party voicemail application 214 can interact with the common voicemail repository 206 and/or the voicemail interface 208 to enhance user access to voicemail content. For example, a third party presentation activity 216 can be used to extend the capabilities of the voicemail interface 208 by presenting various content types (e.g., video, animation, etc.) or by performing enhanced functions on voicemail data. For example, the third party voicemail application 214 and/or the third party presentation activity 216 can perform functions such as transcribing, translating, searching, or other functions on voicemail data.

In some implementations, voicemail interfaces may receive unrestricted permission to access voicemail data provided by various voicemail sources. For example, the security framework 210 can provide full access to the voicemail interface 208 and/or the third party voicemail application 214 for voicemail message data provided by the voicemail sources 202a-c and stored in the common voicemail repository 206. Thus, the voicemail interface 208 and/or the third party voicemail application 214 in the present example can provide a unified user experience regardless of voicemail source. In some implementations, users may be presented with options for granting application permissions upon installation. For example, when installing the third party voicemail application 214 on a computing device, the operating system of the device can present the user with a message explaining the ramifications of granting permission to access voicemail message data. If the user agrees, for example, the third party voicemail application 214 may be granted permission to access voicemail data associated with each of the voicemail sources 202a-c.

Figure 3:
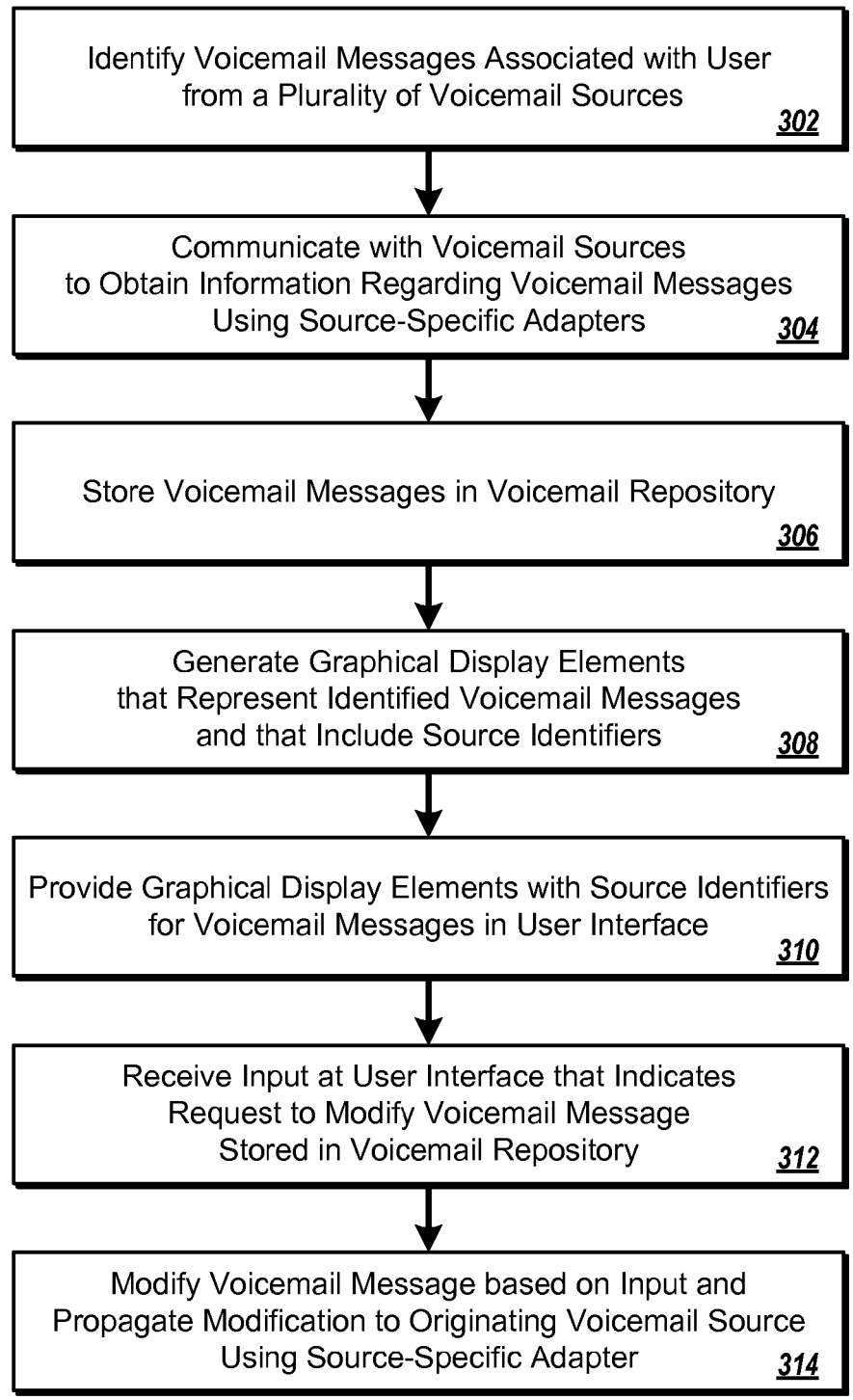
FIG. 3 depicts an example technique for aggregating voicemail messages from multiple sources.

FIG. 3 depicts an example technique 300 for aggregating voicemail messages from multiple sources. In various implementations, the technique 300 may be performed by the systems 100, 150, 200 and/or other systems not depicted, and will be described as being performed by systems 100, 150, and/or 200 for the purpose of clarity. Briefly, the technique 300 includes identifying voicemail messages associated with a user and that are from a plurality of voicemail sources, generating graphical display elements that represent identified voicemail messages and that include source identifiers, and providing the graphical display elements with the source identifiers for voicemail messages in a user interface.

In further detail, at 302, voicemail messages are identified that are associated with a particular user and that are from a plurality of voicemail sources. Referring to FIG. 2, for example, the system 200 can identify voicemail messages for the user from each of the voicemail sources 202a-c. In some implementations, the user may have one or more user accounts for each of the voicemail sources, and the voicemail messages may be identified in association with the accounts. For example, the user may have multiple user accounts (e.g., a personal account, a work account, etc.) provided by the voicemail source 202a (e.g., a communication network carrier), and voicemail messages from each of the accounts may be identified as being associated with a different account. The voicemail messages can be associated with audio and/or video content, for example.

At 304, in some implementations, at least a portion of the plurality of voicemail sources is communicated with to obtain information regarding the voicemail messages, using source-specific adapters that are each configured to use one or more communications protocols that are specific to a voicemail source. For example, each of the source-specific adapters 204a-c (shown in FIG. 2) can communicate with the voicemail sources 202a-c, respectively, to obtain information regarding voicemail messages for the user. The source-specific adapter 204a, for example, can be configured to communicate with the voicemail source 202a by setting up one or more broadcast receivers to be notified of changes by the voicemail source 202a, or the source-specific adapter 204a can poll the voicemail source periodically.

In some implementations, the obtained information may include at least access information used to play the voicemail messages from the plurality of voicemail sources. Referring to FIG. 1A, for example, the voicemail messages 110, 112, 114, 116, 118, and 120 received by the computing device 104 may each include access information such as message and source identifiers. Based on a message and source identifier associated with the voicemail message 110, for example, the user of the computing device 104 can use the information to access the computer system 102*a* (Source A) and play the voicemail message 110 maintained by Source A. As another example, the voicemail messages 110, 112, 114, 116, 118, and 120 received by the computing device 104 may each include message content information to be stored and played by the computing device 104.

In some implementations, the obtained information may include voicemail messages retrieved from the plurality of voicemail sources using the source-specific adapters. Referring again to FIG. 2, for example, each of the source-specific adapters 204*a-c* can retrieve voicemail messages from each of the voicemail sources 202*a-c*, respectively. The retrieved voicemail messages can include voicemail message content (e.g., audio, video, etc.).

At 306, in some implementations, the voicemail messages may be stored in a voicemail repository that stores voicemail messages from the plurality of voicemail sources. For example, voicemail messages retrieved by the source-specific adapter 204*a* from the voicemail source 202*a* for one or more user accounts can be stored in the common voicemail repository 206. In some implementations, the retrieved messages may be stored using a security framework that restricts a voicemail source from accessing voicemail messages from another voicemail source that are stored in the voicemail repository. For example, the security framework 210 can permit the source-specific adapter 204*a* to store voicemail message data from the voicemail source 202*a*, and can restrict voicemail sources 202*b-c* from accessing voicemail data associated with the voicemail source 202*a*. The security framework 210 may handle permissions for accessing voicemail message data by each of the source-specific adapters 204*a-c*, the voicemail interface 208, and third-party applications such as the third party voicemail application 214, for example.

At 308, graphical display elements that represent the identified voicemail messages are generated. The graphical display elements may include source identifiers that indicate a voicemail source from the plurality of voicemail sources for each of the voicemail messages. Referring again to FIG. 1A, for example, the computing device 104 can execute a computer application that generates the graphical display element 130 that represents the voicemail message 110. In the present example, the graphical display element 130 includes the source identifier 108 that indicates that the voicemail message 110 is from Source A. Graphical display elements may include icons, labels, and/or colors to indicate voicemail sources and/or other voicemail information. For example, the graphic display element 130 includes the source identifier 108 (e.g., an icon) and a label noting the voicemail is associated with "Source A". In some implementations, graphical display elements may include overlays, and/or user-selected icons and/or colors. To describe a few possibilities, the user of the computing device 104 may select a photo to be displayed in association with messages from "Jim", a different photo to be displayed in association with messages from "Gwen", and a color (e.g., red) to be displayed in association with messages from his work voicemail account (e.g., messages from Source B).

At 310, the graphical display elements are provided with the source identifiers for the voicemail messages in a user interface through which the voicemail messages are caused to be played based on received user input. Referring to FIG. 1B, for example, the user can interact with the control 188 to play the voicemail message associated with the graphic display element 180. In the present example, the application 166 can receive input associated with user interaction with control 188, and can access voicemail message content from the common voicemail repository 164 and/or the computer system 152*a* (Source A) for presentation to the user.

In some implementations, the plurality of graphical display elements may be provided in the user interface in an arrangement that is based at least in part on an attribute of the plurality of voicemail messages. Referring again to FIG. 1A, for example, the graphical display elements 130, 132, 134, 136, 138, and 140 displayed by the user interface 106 are arranged by time of receipt of the voicemail messages 110, 112, 114, 116, 118, and 120, respectively. As another example, the graphical display elements may be provided in an arrangement based at least on another voicemail message attribute, such as caller identity and/or voicemail source. In some implementations, the arrangement of the voicemail messages may be configurable by the user. Thus, the user of the computing device 104 may elect to arrange graphical representations of voicemail messages such that voicemail messages from the same source are shown together, or such that voicemail messages are arranged by an attribute other than voicemail source and messages from various sources are shown in a comingled manner.

At 312, input may be received at the user interface that indicates a request to modify a voicemail message stored in the voicemail repository. Referring again to FIG. 1B, for example, the user can interact with control 192 to indicate that the voicemail message associated with the graphical display element 180 is to be modified (e.g., deleted). For example, the application 166 can receive input associated with user interaction with the control 192, and can modify (e.g., delete) the voicemail message associated with the graphical display element 180 from the common voicemail repository 164. Other possible message modifications may include, for example, forwarding, saving, and/or adding notes or comments.

At 314, the voicemail message may be modified based on the received input, and the modification may be propagated to an originating voicemail source using the source-specific adapter for the originating voicemail source. In the present example, the command to delete the voicemail message associated with the graphical display element 180 can be provided by the application 166 to the source-specific adapter 162*a*, where it may be propagated to the computer system 152*a* (Source A), thus synchronizing voicemail data maintained by the computer system 152*a* with voicemail data maintained by the computer system 154.

Figure 4:
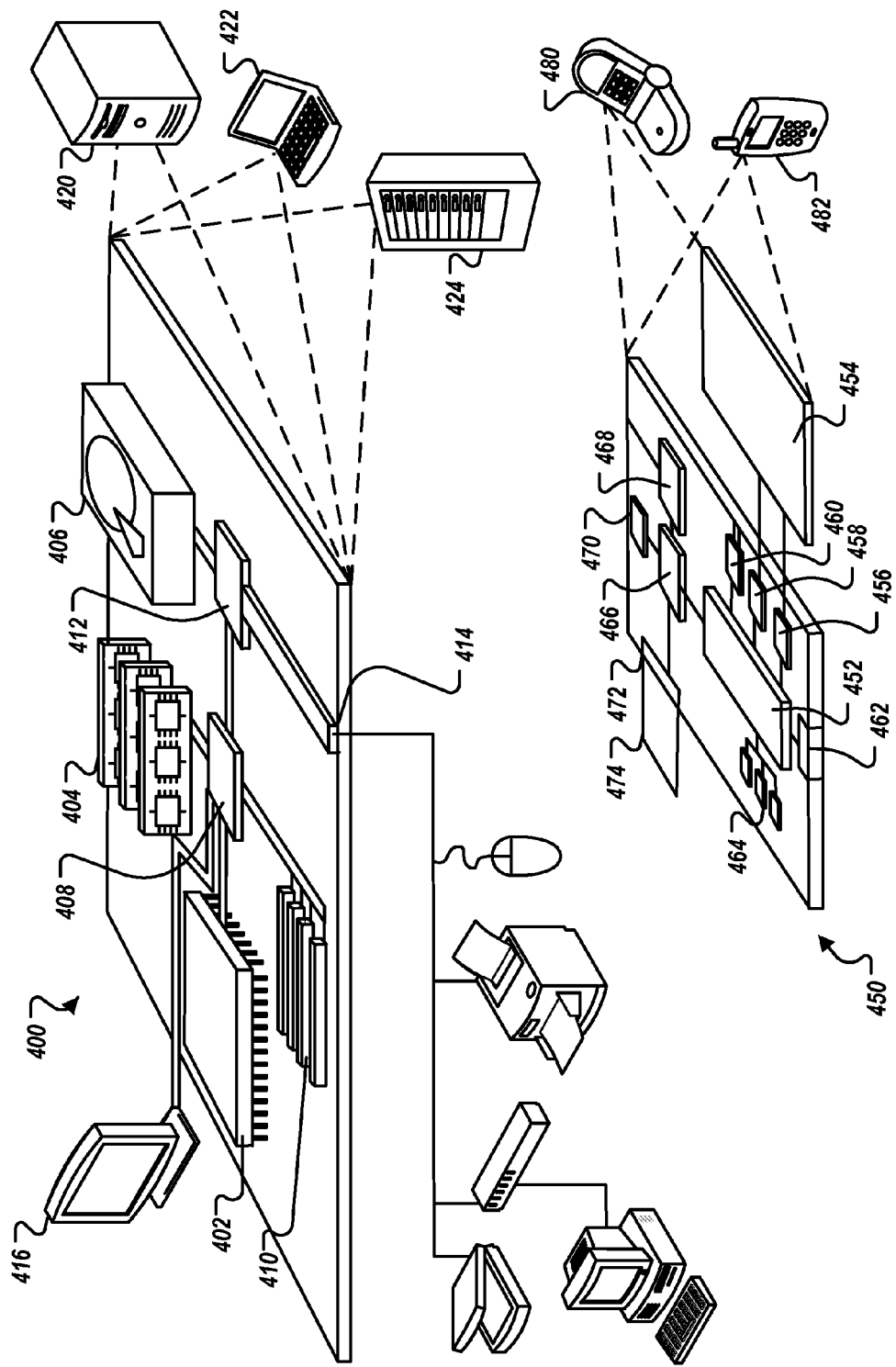
FIG. 4 is a block diagram of computing devices that may be used to implement the systems and methods described in this document, as either a client or as a server or plurality of servers.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
identifying, by a computer system, a plurality of voicemail messages that are associated with a particular user and that are from a plurality of voicemail storage sources that are each separate voicemail management systems;
generating, by the computer system, a plurality of graphical display elements that represent the identified plurality of voicemail messages and that include source identifiers that indicate a voicemail storage source from the plurality of voicemail storage sources for each of the plurality of voicemail messages;
providing the plurality of graphical display elements with the source identifiers for the plurality of voicemail messages in a user interface through which the plurality of voicemail messages from the plurality of voicemail storage sources can be are caused to be played based on received user input;
receiving user input that indicates a request to modify a first voicemail message of the plurality of voice mail messages;
receiving user input at the user interface that indicates a request to modify the voicemail message; and
propagating a modification to the voicemail message, in response to the received user inputs, to an originating voicemail storage source using a source-specific adapter for the originating voicemail storage source.

2. The method of claim 1, wherein the voicemail messages are associated with audio content or video content that is caused to be played based on the received user input.

3. The method of claim 1, wherein the particular user has one or more different user accounts for each of the plurality of voicemail storage sources, and wherein the voicemail messages are identified in association with the one or more user accounts.

4. The method of claim 1, further comprising communicating with at least a portion of the plurality of voicemail storage sources to obtain information regarding the plurality of voicemail messages using source-specific adapters that are each configured to use one or more communication protocols that are specific to a particular voicemail storage source.

5. The method of claim 4, wherein the obtained information includes at least access information that the computer system uses to play the plurality of voicemail messages from the plurality of voicemail storage sources.

6. The method of claim 1, wherein the modification to the voicemail message comprises the voicemail message being deleted.

7. The method of claim 1, wherein the retrieved voicemail messages are stored in the voicemail repository using a security framework that restricts a voicemail storage source from accessing voicemail messages from another voicemail storage source that are stored in the voicemail repository.

8. The method of claim 1, wherein the plurality of graphical display elements includes one or more of an icon, a label, or a color.

9. A computer-implemented method, comprising:
providing, by a computer system in a user interface, a plurality of graphical display elements that represent particular ones of a plurality of voicemail messages from a plurality of separate voicemail management systems, the graphical display elements including source identifiers that indicate a voicemail management system of the plurality of separate voicemail management systems from which particular messages were provided;
receiving user input that indicates a request to modify a voicemail message, of the plurality of voicemail messages that are stored in a voicemail repository that that stores voicemail messages from the plurality of voicemail management systems;
modifying the voicemail message based on the received input; and
propagating the modification to the voicemail message to an originating voicemail management system using a source-specific adapter for the originating voicemail management system,
wherein the plurality of graphical display elements are provided in the user interface in an arrangement that is based at least in part on an attribute of the plurality of voicemail messages.

10. The method of claim 9, wherein the attribute comprises time of receipt of the plurality of voicemail messages.

11. The method of claim 9, wherein the attribute comprises caller identity of the plurality of voicemail messages.

12. The method of claim 9, wherein the attribute comprises voicemail storage source of the plurality of voicemail messages.

13. The method of claim 1, wherein the graphical display elements are arranged in a comingled manner in the user interface so that first graphical display elements representing first voicemail messages from a first voicemail storage source and second graphical display elements representing second voicemail messages from a second voicemail storage source are ordered based at least in part on an attribute other than voicemail message storage source.

14. A computer program product tangibly embodied on a non-transitory computer readable medium storing instructions that, when executed, cause a computer system to perform operations comprising:
identifying, by the computer system, a plurality of voicemail messages that are associated with a particular user and that are from a plurality of voicemail storage sources that are each separate voicemail management systems;
generating, by the computer system, a plurality of graphical display elements that represent the identified plurality of voicemail messages and that include storage source identifiers that indicate a voicemail storage source from the plurality of voicemail storage sources for each of the plurality of voicemail messages;
providing the plurality of graphical display elements with the storage source identifiers for the plurality of voicemail messages in a user interface through which the plurality of voicemail messages from the plurality of voicemail storage sources are caused to be played based on received user input;
receiving user input that indicates a request to modify a first voicemail message of the plurality of voice mail messages;
receiving user input at the user interface that indicates a request to modify the voicemail message; and
propagating a modification to the voicemail message, in response to the received user inputs, to an originating voicemail storage source using a source-specific adapter for the originating voicemail storage source.

15. The computer program product of claim 14, wherein the operations further comprise:
communicating with at least a portion of the plurality of voicemail storage sources to obtain information regarding the plurality of voicemail messages using source-specific adapters that are each configured to use one or more communication protocols that are specific to a voicemail storage source, wherein the obtained information comprises voicemail messages retrieved from the plurality of voicemail storage sources using the source-specific adapters; and
storing the retrieved voicemail messages in a voicemail repository that stores voicemail messages from the plurality of voicemail storage sources.

16. The computer program product of claim 14, wherein the plurality of graphical display elements are provided in the user interface in an arrangement that is based at least in part on an attribute of the plurality of voicemail messages.

17. A system comprising:
a computer system;
an application of the computer system to (a) identify a plurality of voicemail messages that are associated with a particular user and that are from a plurality of voicemail storage sources that are each separate voicemail management systems, (b) generate a plurality of graphical display elements that represent the identified plurality of voicemail messages and that include storage source identifiers that indicate a voicemail storage source from the plurality of voicemail storage sources for each of the plurality of voicemail messages; (c) receive user input that indicates a request to modify a voicemail message of the plurality of voicemail messages; and
an interface to the application to (a) provide the plurality of graphical display elements with the storage source identifiers for the plurality of voicemail messages through which the plurality of voicemail messages from the plurality of voicemail storage sources are caused to be played based on received user input, (b) modify the voicemail message based on the received input, and (c) cause the modification to the voice mail message to be propagated to an originating voicemail storage source using a source-specific adapter for the originating voicemail storage source.

18. The system of claim 17, further comprising:
- a plurality of source-specific adapters that are each configured to use one or more communication protocols that are specific to a voicemail storage source, to communicate with at least a portion of the plurality of voicemail storage sources to obtain information regarding the plurality of voicemail storage sources, wherein the obtained information comprises voicemail messages retrieved from the plurality of voicemail storage sources using the source-specific adapters; and
- a voicemail repository to store the retrieved voicemail messages from the plurality of voicemail storage sources.

\* \* \* \* \*